(12) United States Patent
Zhou et al.

(10) Patent No.: US 11,053,605 B2
(45) Date of Patent: Jul. 6, 2021

(54) METALLIC STRUCTURE AND A METHOD FOR SURFACE TREATMENT OF A METALLIC STRUCTURE

(71) Applicant: City University of Hong Kong, Kowloon (HK)

(72) Inventors: Binbin Zhou, Kowloon (HK); Junda Shen, Kowloon (HK); Yang Yang Li, Kowloon (HK); Jian Lu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/521,687

(22) Filed: Jul. 25, 2019

(65) Prior Publication Data

US 2021/0025072 A1  Jan. 28, 2021

(51) Int. Cl.
  *C25F 3/02*   (2006.01)
  *C25D 5/34*   (2006.01)
  *C25D 3/46*   (2006.01)
  *G01N 21/65*  (2006.01)
  *C25D 7/06*   (2006.01)
  *C25D 5/18*   (2006.01)

(52) U.S. Cl.
  CPC .......... *C25F 3/02* (2013.01); *C25D 3/46* (2013.01); *C25D 5/18* (2013.01); *C25D 5/34* (2013.01); *C25D 7/0607* (2013.01); *G01N 21/658* (2013.01)

(58) Field of Classification Search
  CPC .......................... H01L 21/3063; C25D 5/34
  See application file for complete search history.

(56) References Cited

U.S. PATENT DOCUMENTS

9,518,335 B2 * 12/2016 Zhang .................. C23F 1/00
9,840,789 B2 * 12/2017 Zhang .................. H01M 4/661

FOREIGN PATENT DOCUMENTS

CN       109136620 A  *  1/2019
WO   WO-2017206050 A1 * 12/2017  ............... C25D 7/00

* cited by examiner

*Primary Examiner* — Nicholas A Smith
(74) *Attorney, Agent, or Firm* — Renner Kenner Greive Bobak Taylor & Weber

(57) ABSTRACT

A metallic structure and a method for surface treatment of a metallic structure. The method includes the steps of: defining a first surface morphology on a surface of the metallic structure using a first surface treatment process; and manipulating the surface using a second surface treatment process to transform the first surface morphology to a second surface morphology; wherein the metallic structure is substantially made of a first metallic material; and wherein the second surface treatment process includes performing at least one cycle of depositing the first metallic material on the surface of the metallic structure and etching away at least some of the first metallic material from the metallic structure.

18 Claims, 5 Drawing Sheets

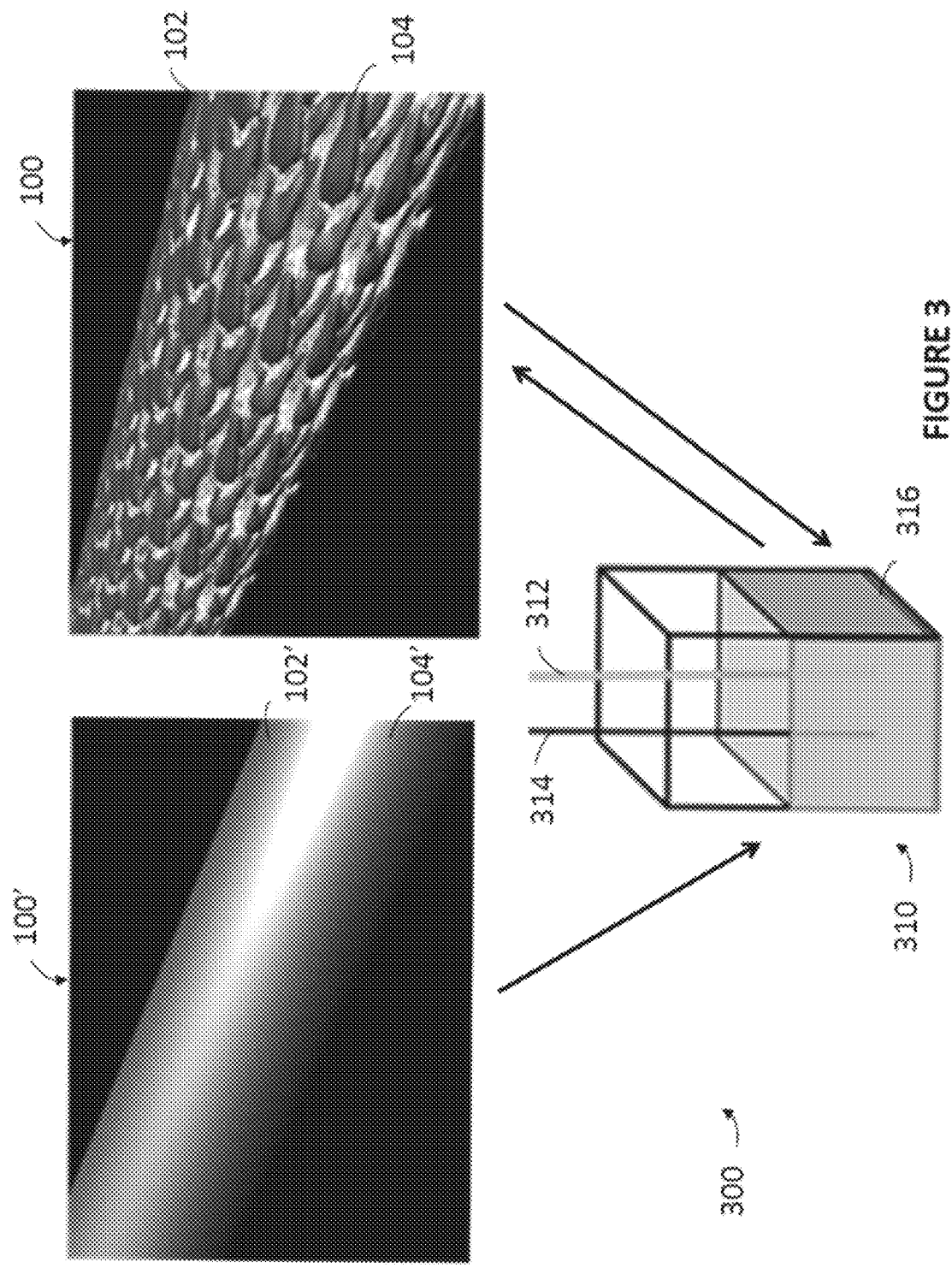

METALLIC STRUCTURE AND A METHOD FOR SURFACE TREATMENT OF A METALLIC STRUCTURE

TECHNICAL FIELD

The present invention relates to a metallic structure and a method for surface treatment of a metallic structure and particularly, although not exclusively, to a method for an electrochemical surface treatment of a metallic structure.

BACKGROUND

Recently, nanostructure materials with large surface areas have caught much attention for their various applications including catalytic applications. As a type of nanostructure materials, oxide-derived nanostructures are recognized as efficient carbon dioxide reducers, super-capacitors, and sensors. Compared with traditional nanostructure materials, the oxide-derived nanostructures offer high chemical activity and abundant adsorption sites due to local pH, grain boundaries, undercoordinated sites, and residual oxides.

A bottom-up approach through the reduction of salt precursors/stabilizers or electrochemical deposition processes is a common approach to synthesize the oxide-derived nanostructures. However, such techniques are often expensive, time-consuming and difficult.

SUMMARY OF THE INVENTION

In accordance with a first aspect of the present invention, there is provided a method for surface treatment of a metallic structure, comprising the steps of: defining a first surface morphology on a surface of the metallic structure using a first surface treatment process; and manipulating the surface using a second surface treatment process to transform the first surface morphology to a second surface morphology; wherein the metallic structure is substantially made of a first metallic material; and wherein the second surface treatment process includes performing at least one cycle of depositing the first metallic material on the surface of the metallic structure and etching away at least some of the first metallic material from the metallic structure.

In one embodiment of the first aspect, the first surface treatment process includes etching away at least some of an impurity different from the first metallic material in the metallic structure.

In one embodiment of the first aspect, the first surface morphology includes a morphology of different nanostructures.

In one embodiment of the first aspect, the second morphology includes a morphology of substantially uniform nanostructures.

In one embodiment of the first aspect, the first and/or the second surface treatment process is performed using an electrochemical cell comprising a first electrode, a second electrode and an electrolyte in electrical connection; wherein the metallic structure is connected as the first electrode; and the electrolyte includes an acid.

In one embodiment of the first aspect, the acid comprises at least one of HCl, HNO3, and H2SO4.

In one embodiment of the first aspect, the step of depositing the first metallic material on the surface of the metallic structure in the second surface treatment process is performed by applying a first electric current across the metallic structure in the electrolyte for a first duration.

In one embodiment of the first aspect, the first duration is 1-300 seconds.

In one embodiment of the first aspect, the first electric current is a negative current.

In one embodiment of the first aspect, the step of etching away at least some of the first metallic material from the metallic structure in the second surface treatment process is performed by applying a second electric current across the metallic structure in the electrolyte for a second duration; wherein the second electric current is different from the first electric current.

In one embodiment of the first aspect, the step of etching away at least some of the first metallic material from the metallic structure is performed after the step of depositing the first metallic material on the surface of the metallic structure.

In one embodiment of the first aspect, the second duration is 1-300 seconds.

In one embodiment of the first aspect, the second electric current is a positive current.

In one embodiment of the first aspect, the second surface treatment process is performed for 10-250 cycles.

In one embodiment of the first aspect, the first metallic material includes a silver-based material.

In one embodiment of the first aspect, the impurity includes copper, aluminum, manganese, or zinc.

In one embodiment of the first aspect, the metallic structure is in the form of a needle, a wire, a foil, a mesh, or a foam.

In one embodiment of the first aspect, the metallic structure includes a silver needle or a SERS substrate.

In accordance with a second aspect of the present invention, there is a metallic structure comprising: a surface morphology formed on a surface of the metallic structure, the metallic structure is substantially made of a first metallic material; wherein the surface morphology is formed by: defining a first surface morphology on the surface using a first surface treatment process; and manipulating the surface using a second surface treatment process to transform the first surface morphology to a second surface morphology; and wherein the second surface treatment process includes performing at least one cycle of depositing the first metallic material on the surface of the metallic structure and etching away at least some of the first metallic material from the metallic structure.

In one embodiment of the second aspect, the metallic structure includes an impurity different from the first metallic material.

In one embodiment of the second aspect, the first surface morphology includes a morphology of different nanostructures.

In one embodiment of the second aspect, the second morphology includes a morphology of substantially uniform nanostructures.

In one embodiment of the second aspect, the first metallic material includes a silver-based material.

In one embodiment of the second aspect, the impurity includes copper, aluminum, manganese, or zinc.

In one embodiment of the second aspect, the metallic structure is in the form of a needle, a wire, a foil, a mesh, or a foam.

In one embodiment of the second aspect, the metallic structure includes a silver needle or a SERS substrate.

BRIEF DESCRIPTION OF THE DRAWINGS

Embodiments of the present invention will now be described, by way of example, with reference to the accompanying drawings in which:

FIG. 3 is a schematic diagram showing an exemplary application of the method of FIG. 2 on a metallic structure (top left) to obtain the surface morphology of FIG. 1 (top right);

DETAILED DESCRIPTION OF THE PREFERRED EMBODIMENT

The inventors have, through their own research, trials and experiments, devised that detecting trace target analytes in vivo with minimal invasion is challenging but of fundamental importance to biological detection. Among various analytical techniques, surface-enhanced Raman scattering (SERS) technique holds great promise to provide a solution for non-destructive and ultrasensitive characterization down to single-molecular level.

Metallic structures may be used in various analytical techniques. Some metallic structures may be used as SERS substrates, which can be divided into two categories: sol-nanoparticles and nanoparticles that are integrated on a single plate by means of self-assembly, evaporation or photolithography.

Some of these example SERS substrates, which are made integrated on a single plate through self-assembly, evaporation or photolithography, are not able to obtain depth-profile information in vivo, and lack feasibility for rapid field detection.

Figure 1:
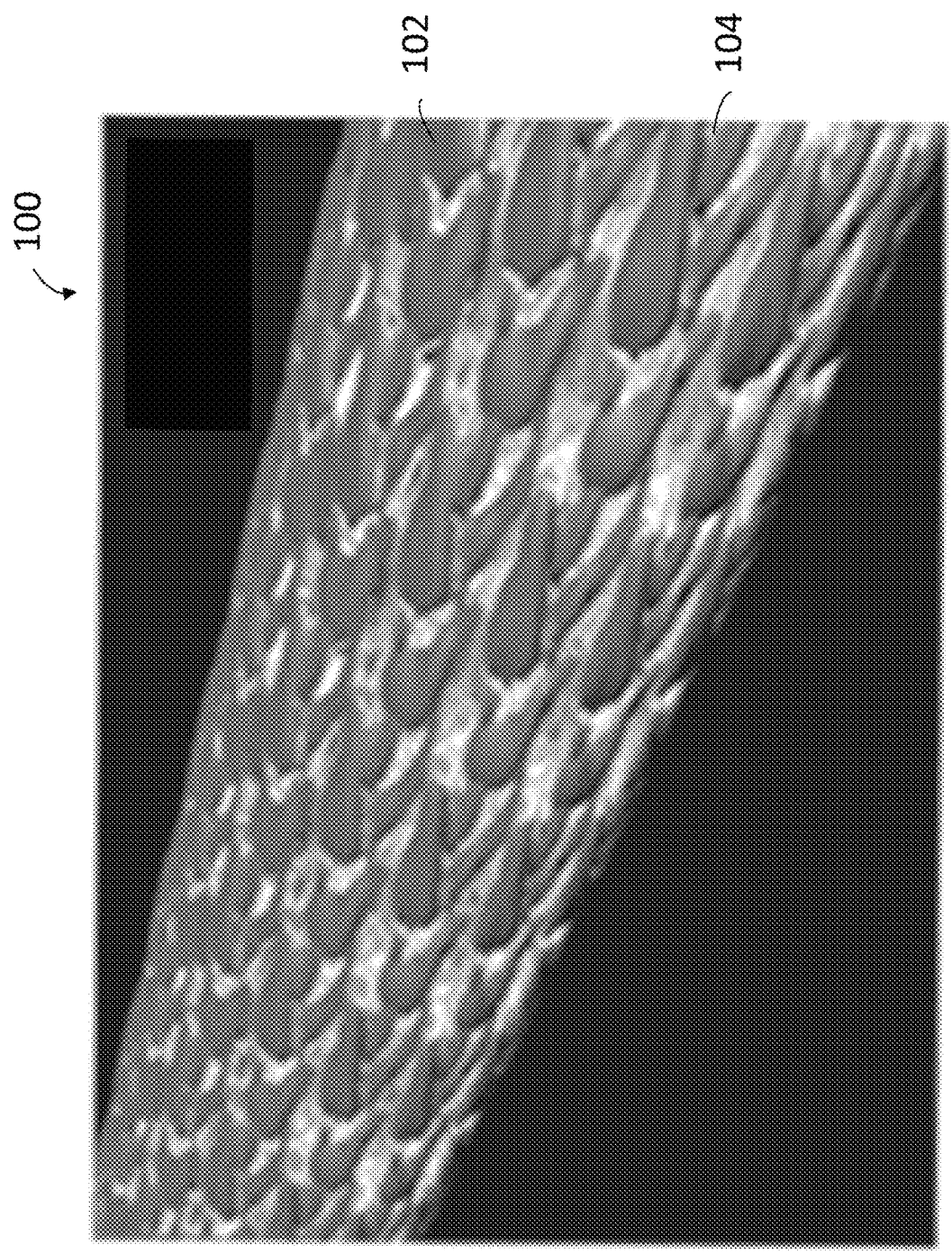
FIG. 1 is a schematic diagram showing a surface morphology of a metallic structure in accordance with one embodiment of the present invention.

With reference to FIG. 1, there is shown an embodiment of a metallic structure 100 having a surface morphology 102 formed on a surface 104 of the metallic structure 100. Preferably, the surface morphology 102 may be formed by using a two-step process, including: defining a first surface morphology on the surface 104 using a first surface treatment process; and manipulating the surface 104 using a second surface treatment process to transform the first surface morphology to a second surface morphology.

The metallic structure 100 is substantially made of a first metallic material, such as silver or a silver-based material, wherein the second surface treatment process includes performing at least one cycle of depositing the first metallic material on the surface 104 of the metallic structure and etching away at least some of the first metallic material from the metallic structure 100.

In this example, the illustrated metallic structure 100 is a silver needle with a surface morphology 102 of substantially uniform nanostructures. Alternatively, the metallic structure 100 may be in the form of a needle, a wire, a foil, a mesh, or a foam, with the nanostructures formed on the surface of the structure 100.

The metallic structure 100 may further include an impurity different from the first metallic material. For example, the impurity may include copper, aluminum, manganese, and/or zinc. The existence of the impurity may facilitate the formation of an initial surface morphology as described below.

Figure 2:
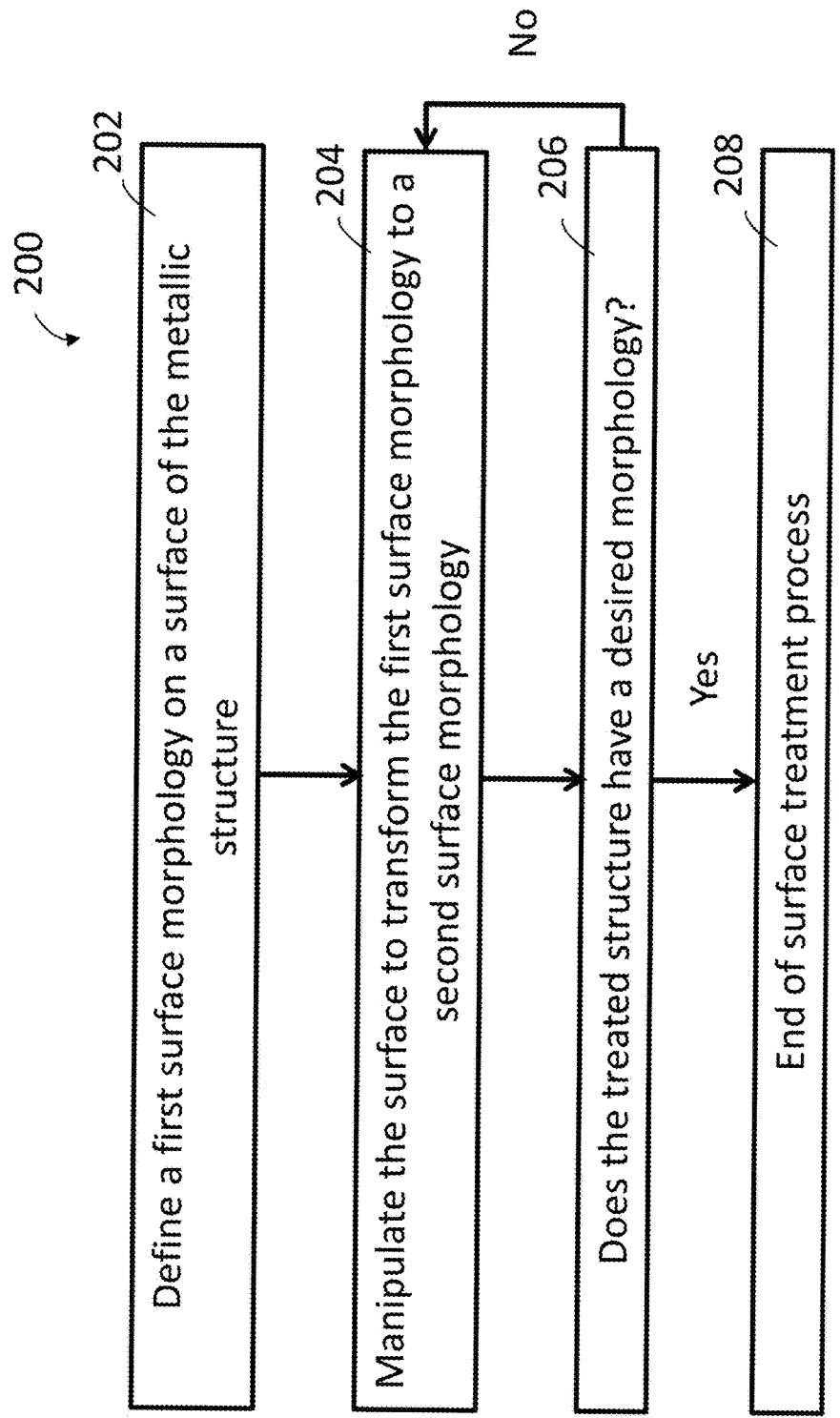
FIG. 2 is a flow diagram showing a general method for surface treatment of a metallic structure in accordance with one embodiment of the present invention.

FIG. 2 illustrates a general method 200 for surface treatment of a metallic structure (for example, the silver needle 100 of FIG. 1) substantially made of a first metallic material in accordance with one embodiment of the present invention.

The method begins in step 202, in which a first surface morphology is defined on a surface of the metallic structure using a first surface treatment process. For example, the silver needle to be treated may have a smooth surface to begin with. The first surface treatment process may define a roughened surface morphology on the smooth surface of the silver needle by etching or sanding. Preferably, the first surface morphology includes a morphology of different nanostructures.

Preferably, the first surface treatment process includes etching away at least some of an impurity different from the first metallic material in the metallic structure. For example, a selective etching process may be carried out to etch away some of the metallic impurities from the metallic structure 100, using a selective etchant. In some example embodiment, acidic etchants such as HCl, $HNO_3$ and/or $H_2SO_4$ may be used to perform the initial etching process. Due to the different etching rates of different materials the etchant, an initial nanoscale structure may be defined on the surface of the metallic structure 100.

Alternatively, the first surface morphology may be obtained using other method such as mechanical polishing of the surface of the metallic structure 100, or by deposition of additional material on the surface of the metallic structure 100.

The method then proceeds to step 204, in which the surface of the silver needle is manipulated using a second surface treatment process to transform the first surface morphology to a second surface morphology. In particular, the second surface treatment process includes performing at least one cycle of depositing (e.g. electrodepositing) the first metallic material on the surface of the metallic structure and etching away at least some of the first metallic material from the metallic structure. Preferably, the second surface morphology includes a morphology of substantially uniform nanostructures.

In such process step, the same metallic material may be repeatedly deposited on the surface of the metallic structure and then etched away from the surface. For example, in a process involving the surface treatment of a silver needle, silver may be repeatedly deposited on the surface of the silver needle and some silver may be further etched away to obtained a modified surface morphology. In this example, etched silver dissolved in the acidic solution may again return back to the surface of the silver needle in the subsequent cycle of electrodeposition.

In step 206, if the treated structure obtained after step does not have a desired surface morphology, e.g., the size and/or number of nanostructures are not as desired for a particular application, method returns to step 204 to repeat the second surface treatment process, specifically the depositing and etching away steps, until the desired surface morphology is obtained, although in some example embodiments, an excessively large cycle number is not preferable as it may lead to collapse of the whole framework.

In one embodiment, step 204 is repeated for 1 to 300 times, and more preferably, 10 to 250 times. Finally, method ends in step 208 upon obtaining a treated structure with a desired surface morphology.

FIG. 3 is a schematic diagram showing an exemplary application of the method 200 on a metallic structure to obtain a desired surface morphology (e.g. the surface morphology 102 of the metallic structure 100 of FIG. 1) using a first surface treatment process and a second surface treatment process. For simplicity and ease of presentation, the method 300 will be discussed below with reference to the silver needle 100. The method 300 begins with a silver needle 100' with a smooth surface morphology 102' on a surface 104' of the silver needle 100'. The silver needle 100' also includes an impurity.

In the illustrated embodiment, both the first and the second surface treatment processes are performed using an electrochemical cell 310. The electrochemical cell 310 includes a first electrode 312, a second reference electrode 314 and an electrolyte 316 in electrical connection. The silver needle 100' is connected as the first electrode 312, platinum is connected as the second reference electrode 314, and $HNO_3$ is used as the electrolyte 316. In an alternative embodiment, the first surface treatment may be performed using other non-electrochemical methods, or the electrolyte 316 may include other acids, such as HCl and $H_2SO_4$. Yet alternatively, buffered etchants may be used as electrolytes in the electrochemical cell 310.

As shown in FIG. 3, the original surface morphology 102' of the silver needle 100' (i.e. the first electrode 312) is smooth and free of nanostructures. In the first surface treatment process, the impurity on the surface 104' of the silver needle 100' is selectively etched away to obtain a roughened silver surface with a surface morphology of different nanostructures (not shown) and the structure is ready for the next treatment cycle.

Following etching away at least some of the impurity, the roughened metallic structure then undergoes the second surface treatment process. In the embodiment of FIG. 3, the roughened silver needle is treated by electrodepositing silver on the surface of the silver needle using the electrochemical cell 310. After that, the silver needle is further treated by etching away at least some of the silver from the silver needle.

In one embodiment, the electrodeposition is performed by applying a first electric current across the metallic structure in the electrolyte for a first duration; and the etching in both the first and second surface treatment processes is performed by applying a second electric current different from the first electric current across the metallic structure in the electrolyte for a second duration. The first and second durations may each be between 1 and 400 seconds, and more preferably, between 1 and 300 seconds. In some examples, excessively durations would result in the collapse of the whole framework.

In an alternative embodiment, the electric current applied to etch in the first and second surface treatment processes may be different. In one example, the first and second electric current may be in the form of a current wave such as AC square or sinusoidal current wave, i.e., the first electric current is a negative current, and the second electric current is a negative current. The current wave may be periodic.

Alternatively, the first and the second treatment process may be performed in different chemical setups, or electrochemical cells with different reference electrodes and/or electrolytes/etchants. For example, supply of electrical current may be not necessary for etching away the impurities from the metallic structure in the first surface treatment process.

Depositing and etching of the second surface treatment process may be repeated for a number of cycles, until a silver needle 100 of a desired roughened surface 104 (with surface nanostructures) is achieved. The resulting silver needle may be used as SERS substrates, catalysts, and sensors with enhanced performance. Particularly, the resulting silver needle may be used in in vivo measurements, and detection in the tissues of biological systems.

In one example embodiment, a silver acupuncture needle with copper as an impurity is processed using the method 200 with reference to FIG. 3 as discussed above, and effects of using different experimental conditions were investigated by the inventors.

In the experiment carried out by the inventors, both the first and second surface treatment processes (including the electrodeposition and etching steps), with reference to FIG. 3, were carried out at room temperature using a computer controlled potentiostat (Autolab PGSTAT302N) in a two electrode electrochemical cell. Similar to the electrochemical cell in FIG. 3, the electrochemical cell used in the experiment included a platinum reference electrode, and the silver acupuncture needle as the working electrode. An aqueous solution of 0.1 M nitric acid was used as the electrolyte.

Prior to the electrochemical treatment, the silver acupuncture needle was soaked in acetone and ultrasonicated for 5 minutes to remove the organic matter from the surface of the silver needle. A current square-wave was applied which periodically modulated between two extreme values for n cycles: a cathodic current A1 for a time duration t1 for etching silver, and copper and other impurities on the surface of the silver needle, and a cathodic current A2 for a time duration t2 for selectively electrodepositing silver (in one example, A1=0.04 A, A2=−0.04 A, $t_1=t_2=5$ seconds, and n=20).

A scanning electron microscope was used to examine sample morphology. With reference to FIGS. 4A-4C and 5A-5D, there is shown SEM images of the roughened silver acupuncture needle fabricated based on the method of FIG. 3 with different parameters (etching in the first treatment process at 0.04 A for 5 seconds, electrodeposition in the second treatment process at −0.04 A for 5 seconds, etching in the second treatment process at 0.004 A for 5 seconds, the second treatment process repeated for n cycles). The scale bars in FIGS. 4A-4C and FIGS. 5A-5D indicate 2 μm and 1 μm, respectively.

Figure 4B:
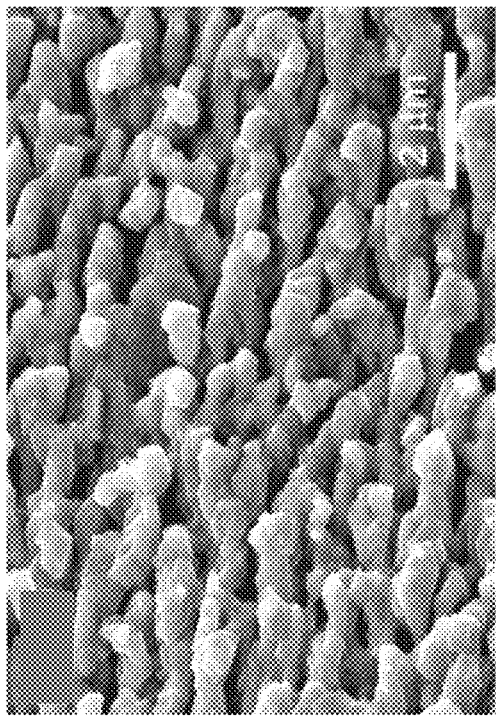
FIG. 4B is an SEM image of the metallic structure treated with the method of FIG. 2 using 0.1 M HCl.
Figure 4A:
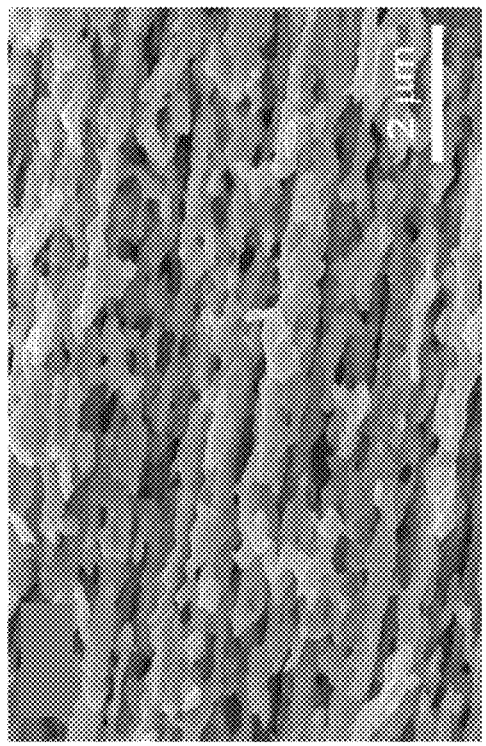
FIG. 4A is an SEM image of the metallic structure treated with the method of FIG. 2 using 0.1 M $HNO_3$.
Figure 4C:
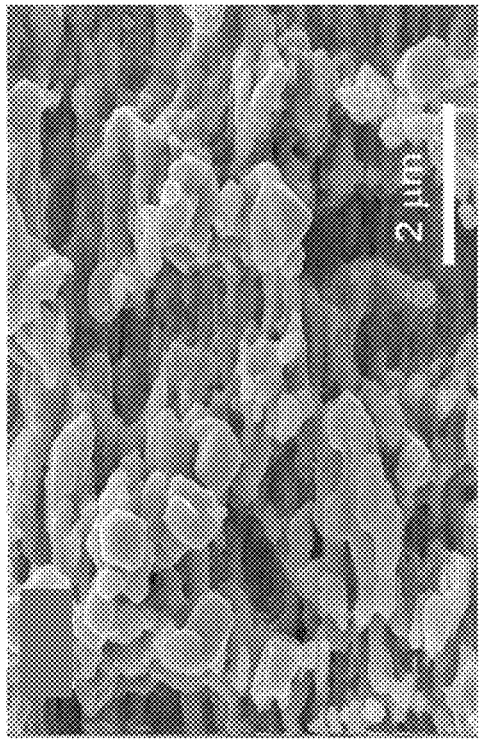
FIG. 4C is an SEM image of the metallic structure treated with the method of FIG. 2 using 0.1 M $H_2SO_4$.

The effects of different electrolytes (0.1 M $HNO_3$, 0.1 M HCl, 0.1 M $H_2SO_4$) and treatment cycle number (n=0, 20, 50, 100) were investigated. As shown in FIGS. 4A-4C, the surface morphologies obtained using different acidic electrolytes could be very different, showing the ability of manipulating the surface morphology of the metallic structure, depending on the application, using different kinds of electrolyte.

Figure 5B:
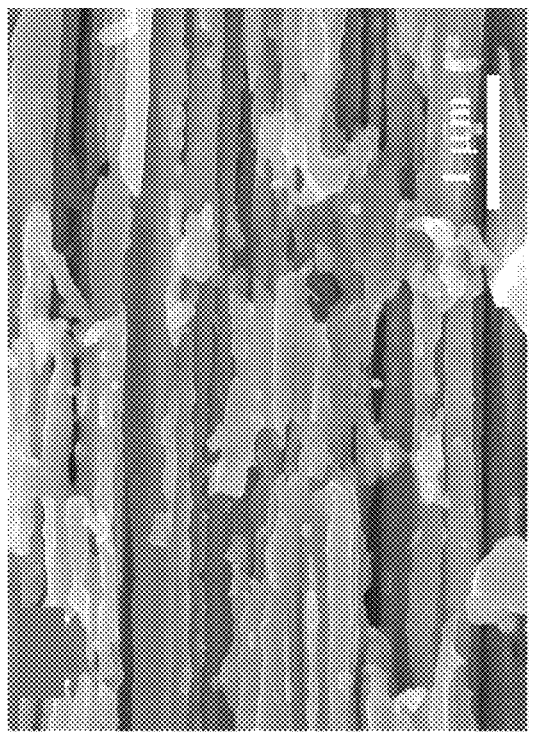
FIG. 5B is an SEM image of the metallic structure treated with the method of FIG. 2 for 20 cycles.
Figure 5D:
FIG. 5D is an SEM image of the metallic structure treated with the method of FIG. 2 for 100 cycles.
Figure 5A:
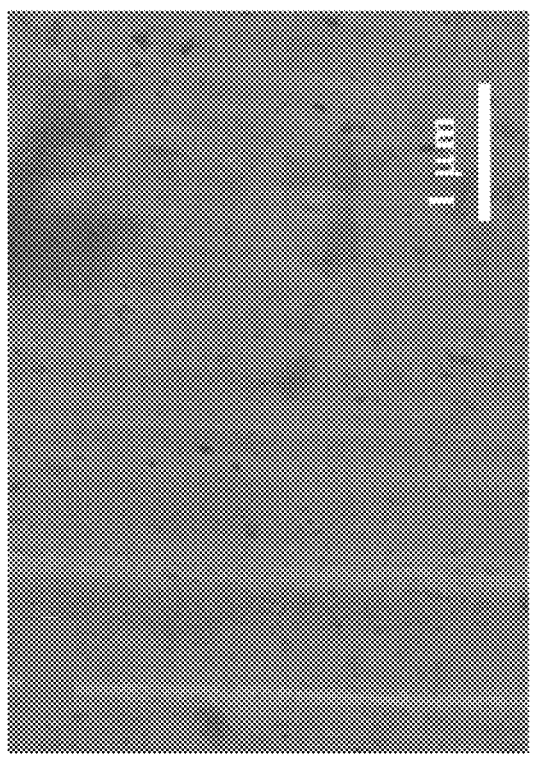
FIG. 5A is an SEM image of the metallic structure treated with the method of FIG. 2 for 0 cycles.
Figure 5C:
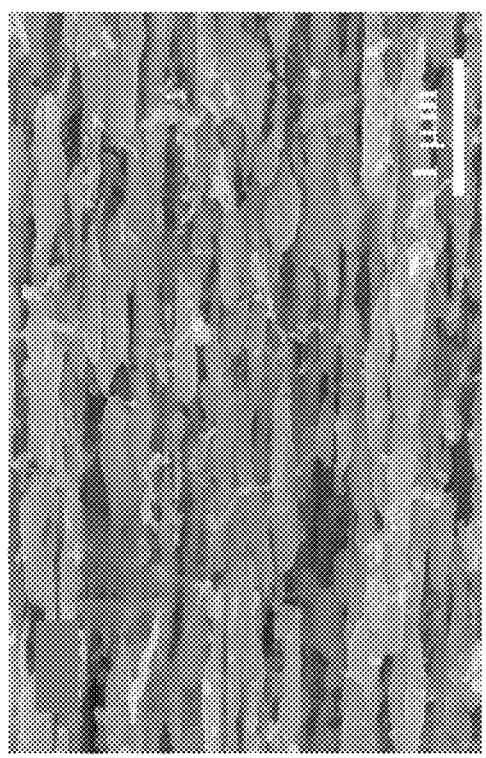
FIG. 5C is an SEM image of the metallic structure treated with the method of FIG. 2 for 50 cycles.

In addition to different electrolytes, as shown in FIGS. 5A-5D, different cycle numbers n also have an influence on the surface morphology of the silver needle. FIG. 5A clearly shows the original smooth surface of the silver needle, when the second treatment process was repeated for 0 cycles. For a given time period $t_1$, $t_2$ of 5 seconds, the needle would gradually become more roughened with an increased cycle number n, showing the ability to orient the nanostructures on the surface of the silver needle with different cycle numbers n.

In one embodiment of the present invention and in the subsequent discussion, $HNO_3$ as the electrolyte, and cycle number n of 20 are chosen to produce silver needles, as this combination may provide an optimal balance between obtaining a greatly roughened surface and maintaining structural integrity of the needle framework in this particular example. However, it is appreciated by a skilled person that a different number of etching/deposition cycle, the concentration and/or the composition of the etchant may be chosen based on different surface morphologies required.

In one example embodiment, the roughened silver acupuncture needle obtained using the method of FIG. 3 may be used in Surface-Enhanced Raman Scattering (SERS) applications. The roughened silver needle can be used as a penetrable SERS substrate due to the rigidity.

Advantageously, embodiments of the present invention can be used to produce penetrable metals with a nanostructured surface area, making them attractive SERS substrates which can obtain the depth-profile in formation in vivo in a few minutes.

With reference to FIG. 5A, an original smooth surface of the silver needle provides a low SERS enhancement effect for the lack of plasmonic hot spots. After roughening, with reference to FIGS. 5B to 5D, the roughened silver needle includes more hot pots, and this is favorable for enabling the SERS enhancement effect. The resulting silver needle showed remarkable SERS enhancement effect with uniform responses, as demonstrated on Rhodamine b with a detection limit below $10^{-13}$ M. The resulting silver needle also showed great potential in sampling deep tissues in aquatic products, and ultrasensitive detection of analyte in living systems. In one example, the electrochemically treated silver needle was inserted into a fish and obtained the depth-profile information of malachite green (MG) in the fish in 15 minutes.

Using silver needle as an exemplary material system, the above description demonstrated a convenient solution-based electrochemical method for effectively roughening metallic structures and thus producing a novel kind of metal framework, including well-defined and roughened surface nanostructures, whose surface morphology can be easily controlled by adjusting the electrochemical parameters. Furthermore, the large surface area resulting from the surface nanostructures are potentially desirable for catalysis and electrode applications. As mentioned above, the surface nanostructures can be oriented at different cycle numbers. These oriented nanostructures may serve as good substrates for molecular adsorption and Raman signal amplification.

Alternatively, embodiments of the present invention may be applied to various applications and fields. For example, embodiments of the present invention can be used to apply novel functions of electrodes to traditional nanostructured materials that are used as sensor. In another example embodiment, the surface treatment process may be used to produce robust 3D metal networks of large surface area, well-suited for catalysis applications.

Whilst the above description is made with reference to silver needles, the design methods and fabrication strategy in the embodiments of the present invention are generally applicable to other metallic structures (e.g., metal foils, wires or meshes) for improving their performance in various applications. For example, metallic structure of copper may be treated similarly to obtain a roughened surface using a similar electrodeposition/etching cycle process.

These embodiments may be advantageous in that the present invention provides a convenient and economical electrochemical approach to bestow a 3D metal needle or other metallic structures with a controllable nanostructured surface. Through optimizing the electrochemical parameters, the surface morphology of the metal needles or other metallic structures can be effectively adjusted.

Advantageously, the method of surface treatment only require a relatively simple setup, i.e. an electrochemical cell including one working electrode, one reference/inert electrode and relatively common reagents/acids such as HCl, $H_2SO_4$ or $HNO_3$, without the need to use expensive equipment such as vacuum, clean room, or sophisticated control systems, which are generally required by other microprocessing technologies for making nanostructured metallic structures. The process is also compatible with convenient large-area fabrication with high uniformity that can be readily mass produced on an industrial scale.

In addition, tailor-made, elaborate structural profiles can be accurately targeted and achieved with high purity. The structural features of the product can be easily adjusted by modifying the process parameters of electrochemical treatment.

Further/other advantages of the present invention in terms of cost, structure, function, ease of manufacture, economics, etc., will become evident to a person skilled in the art upon reading the above description and the reference drawings.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for surface treatment of a metallic structure, comprising the steps of:
    defining a first surface morphology on a surface of the metallic structure using a first surface treatment process; and
    manipulating the surface using a second surface treatment process to transform the first surface morphology to a second surface morphology;
    wherein the metallic structure is substantially made of a first metallic material and includes an impurity different from the first metallic material, the impurity facilitating a formation of the first surface morphology;
    wherein the first surface treatment process includes using a selective etchant to etch away at least some of the impurity to form an initial nanoscale structure prior to the use of the second surface treatment process; and
    wherein the second surface treatment process includes performing at least one cycle of depositing the first metallic material on the surface of the metallic structure and etching away at least some of the first metallic material from the metallic structure.

2. The method in accordance with claim 1, wherein the metallic structure has a smooth surface morphology prior to being treated by the first surface treatment process.

3. The method in accordance with claim 1, wherein the first surface morphology includes a morphology of different nanostructures.

4. The method in accordance with claim 1, wherein the second surface morphology includes a morphology of substantially uniform nanostructures.

5. The method in accordance with claim 1, wherein the first and/or the second surface treatment process is performed using an electrochemical cell comprising a first electrode, a second electrode and an electrolyte in electrical connection; wherein the metallic structure is connected as the first electrode; and the electrolyte includes an acid.

6. The method in accordance with claim 5, wherein the acid comprises at least one of HCl, $HNO_3$, and $H_2SO_4$.

7. The method in accordance with claim 5, wherein the step of depositing the first metallic material on the surface of the metallic structure in the second surface treatment process is performed by applying a first electric current across the metallic structure in the electrolyte for a first duration.

8. The method in accordance with claim 7, wherein the first duration is 1-300 seconds.

9. The method in accordance with claim 7, wherein the first electric current is a negative current.

10. The method in accordance with claim 7, wherein the step of etching away at least some of the first metallic material from the metallic structure in the second surface treatment process is performed by applying a second electric current across the metallic structure in the electrolyte for a second duration; wherein the second electric current is different from the first electric current.

11. The method in accordance with claim 7, wherein the step of etching away at least some of the first metallic material from the metallic structure is performed after the step of depositing the first metallic material on the surface of the metallic structure.

12. The method in accordance with claim 10, wherein the second duration is 1-300 seconds.

13. The method in accordance with claim 10, wherein the second electric current is a positive current.

14. The method in accordance with claim 1, wherein the second surface treatment process is performed for 10-250 cycles.

15. The method in accordance with claim 1, wherein the first metallic material includes a silver-based material.

16. The method in accordance with claim 1, wherein the impurity includes copper, aluminum, manganese, or zinc.

17. The method in accordance with claim 1, wherein the metallic structure is in the form of a needle, a wire, a foil, a mesh, or a foam.

18. The method in accordance with claim 1, wherein the metallic structure includes a silver needle or a SERS substrate.

* * * * *